Oct. 23, 1923.  
J. A. HEPPERLEN  
1,472,001  
SYSTEM AND APPARATUS FOR MOTOR CONTROL  
Filed Feb. 13, 1923
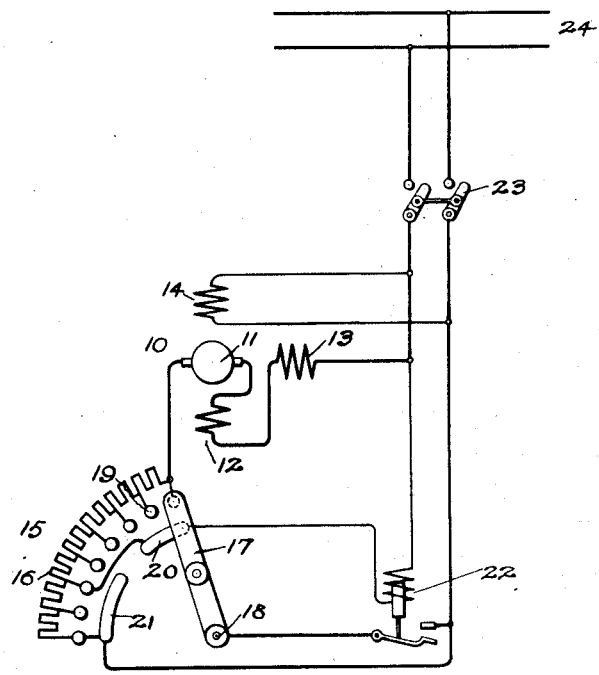
Inventor:  
John A. Hepperlen  
by Alexander S. Lunt  
His Attorney.

Patented Oct. 23, 1923.

1,472,001

UNITED STATES PATENT OFFICE.

JOHN A. HEPPERLEN, OF EAST ORANGE, NEW JERSEY, ASSIGNOR TO GENERAL ELECTRIC COMPANY, A CORPORATION OF NEW YORK.

SYSTEM AND APPARATUS FOR MOTOR CONTROL.

Application filed February 13, 1923. Serial No. 618,835.

*To all whom it may concern:*

Be it known that I, JOHN A. HEPPERLEN, a citizen of the United States, residing at East Orange, in the county of Essex, State of New Jersey, have invented certain new and useful Improvements in Systems and Apparatus for Motor Control, of which the following is a specification.

This invention relates to improvements in systems and apparatus for starting and regulating the speed of electric motors.

One of the objects of the invention is to provide an improved arrangement whereby the motor may be safely started and the operating speed of the motor either predetermined or adjustable at the will of the operator after the motor has started.

A further object of the invention is to provide an arrangement involving the use of an electromagnetic switch which is connected so as to close substantially simultaneously with the connection of the motor to the source of supply when the amount of the resistance which is to be retained in the motor circuit is comparatively high and which is connected to close responsively to the speed of the motor when the amount of the resistance which is to be retained in the motor circuit is comparatively low.

For a better understanding of the invention, reference is had to the accompanying drawing wherein I have illustrated in very simple diagram an embodiment of the invention for the purpose of explaining the principles thereof. Referring to the drawing, the electric motor 10 is indicated as of the direct current type having an armature 11, series field 12 and a commutating field 13 in the motor armature circuit, and a shunt field 14. This motor is arranged to be controlled by the rheostat 15 which is provided with a resistor 16 and an adjustable member 17 which is pivotally mounted at 18 and arranged to cooperate with the contact buttons 19 and the contact segments 20 and 21 for controlling the starting and the running speed of the motor. The electromagnetic switch or contactor 22 is preferably of the shunt type and has its switch contacts included in series in circuit with the adjustable member 17. The arrangement is such that when the adjustable member 17 is set so as to retain a comparatively large amount of the resistance 16 in the motor armature circuit, the electromagnetic switch 22 will be substantially simultaneously closed with the connection of the motor to the source of supply, but in case the adjustable member is in such a position that a comparatively small amount of the resistance is to be retained in the motor circuit, the switch 22 is arranged to be closed in accordance with the speed of the motor. It will be observed that the switch 22 in closing short circuits the portion of the resistance 16 which it is desired shall be excluded from the motor circuit. The winding of this switch is preferably such that when substantially fifty per cent of the supply circuit voltage is applied to the switch, the switch will be closed.

As thus constructed and arranged, and with the parts in their respective positions shown in the drawing, the operation of my invention is as follows: In order to start, the disconnecting switch 23 will be closed. This switch is indicated as a manually operated double-pole switch, but I would have it understood that the particular form of this switch is not of the essence of my invention, since the circuit controlled by the switch may be closed by means of an electromagnetic switch and the closing of the circuit controlled by the switch may be either manually or automatically controlled. When the switch 23 is closed, the electric motor is energized from the supply circuit 24, with the two lower sections of the resistor 16 included in the armature circuit of the motor. Because of the fact that the winding of the electromagnetic switch 22 is connected so as to be energized responsively to the counter-electromotive force of the motor when the rheostat arm or adjustable member 17 is in the position shown in the drawing, the switch 22 will not close until after the motor has speeded up to such a value that the counter-electromotive force is substantially fifty per cent of the supply circuit potential. I would have it understood that while I have indicated as a preferred arrangement that the switch 22 should be energized to close at substantially fifty per cent of supply circuit potential, my invention is not necessarily limited to this particular value, since the arrangement may be such that the switch will close at any predetermined percentage of the supply circuit potential. When the switch 22 closes, the resistor 16 is completely short circuited and the motor is connected directly to the supply circuit so as to run at a comparatively high speed. If it is desired that the speed of the motor shall be decreased, the rheostat arm or adjusting member 17 may be moved counter-clockwise to reinsert a portion or all of the resistance 16 in the motor armature circuit. This may be done at will while the motor is running, since the switch 22 will be maintained closed.

Assume that the rheostat arm or adjusting member 17 is moved to make engagement with the third contact button from the top and it is desired to start the motor, the disconnecting switch 23 will be closed as before, thereby connecting the motor to the source of supply with the two lower and the two upper sections of the resistance 16 included in the motor armature circuit. The winding of the contactor 22 will be connected so as to be energized responsively to the counter-electromotive force of the motor as before, and when the contactor closes it will short circuit the two lower sections of the resistor 16 and the two upper sections will be retained in the circuit.

In case it is desired that the three upper sections of the resistor 16 shall be retained in the motor circuit, the rheostat arm will be moved to the fourth contact button from the top, and in such a case when the disconnecting switch 23 is closed, the contactor 22 will be energized across the supply circuit with the two lower resistor sections included in the circuit of the winding of the contactor. The contactor will therefore close substantially simultaneously with the closing of the disconnecting switch 23, but the motor will be protected because of the fact that the three upper sections of the resistor are retained in the motor circuit. If the rheostat arm is moved further counter-clockwise, the amount of the resistor 16 which is retained in the motor circuit will be increased and the contactor 22 will be energized in accordance with the supply circuit potential and closed substantially simultaneously with the closing of the disconnecting switch.

The arrangement above set forth has several important advantages, among which may be mentioned the fact that a shunt wound electromagnetic switch may be employed. Electromagnetic switches having shunt windings are comparatively inexpensive to manufacture, and the switches are generally speaking very reliable in operation. Another important advantage is that in case the operator has set the rheostat arm to such a position that the motor will not start under load, the rheostat may be varied so that a greater value of current will be admitted to the motor to permit the same to start, but the motor is in all cases protected by reason of the fact that the motor cannot be connected directly to the source of supply for starting without having at least the two lower sections of the resistor included in the motor armature circuit to protect the motor from a dangerous rush of current. For example, if the rheostat arm is in the lowest position and the load on the motor is so great that the motor is unable to overcome the static friction with all the resistance in the motor armature circuit, the rheostat arm may be moved forward a step or so in order to eliminate sufficient resistance to allow the motor to start. When the rheostat arm is moved to such a position, the contactor 22 is energized to positively close and thereby exclude a portion of the resistor from the motor armature circuit so as to permit the motor to start. After the motor has started, any desirable running speed may be had by varying the position of the rheostat arm.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:—

1. A motor controller comprising a rheostat arranged to be included in the motor circuit and having an adjustable member for varying at will the amount of the resistance of said rheostat which is to be retained in the motor circuit, an electromagnetic switch for short circuiting the portion of the resistance of said rheostat which is to be excluded from the motor circuit, and connections whereby the said switch is energized to close substantially simultaneously with the connection of the motor to a source of supply when the amount of the resistance of said rheostat which is to be retained in the motor circuit is comparatively high and the said switch is energized to close responsively to the speed of the motor when the amount of the resistance of said rheostat which is to be retained in the motor circuit is comparatively low.

2. A motor controller comprising a rheostat arranged to be included in the motor circuit and having an adjustable member for varying at will the amount of the resistance of said rheostat which is to be retained in the motor circuit, an electromagnetic switch having a shunt winding for closing the switch at a smaller value of voltage than the voltage of the supply circuit to short circuit the portion of the resistance of said rheostat which is to be excluded from the motor circuit, and connections whereby substantially full supply circuit potential is applied to said switch to cause the same to close substantially simultaneously with the connection of the motor to the source of supply when the amount of the resistance of said rheostat which is to be retained in the motor circuit is comparatively high and the said switch is energized to close responsively to the counter-electromotive force of the motor when the amount of the resistance of said rheostat which is to be retained in the motor circuit is comparatively low.

3. The combination with an electric motor of a resistance included in the armature circuit of said motor, an adjustable member for varying at will the amount of said resistance which is to be retained in the motor circuit, a normally open electromagnetic switch having a shunt winding and having its contacts in series with the said adjustable member for short circuiting the portion of said resistance which is to be excluded from the motor circuit, the winding of said switch arranged to close the switch at substantially fifty per cent of supply circuit voltage, and connections whereby substantially full supply circuit potential is applied to the winding of said switch when the said adjustable member is in a position to retain a comparatively large amount of the said resistance in the motor circuit and the winding of the said switch is energized responsively to the counter-electromotive force of the motor when the said adjustable member is in a position to retain a comparatively small amount of the said resistance of the motor circuit.

In witness whereof, I have hereunto set my hand this tenth day of February, 1923.

JOHN A. HEPPERLEN.